United States Patent
Hirt et al.

[11] 3,783,681
[45] Jan. 8, 1974

[54] METHOD AND APPARATUS TO MONITOR QUALITY OF OPERATION OF A PISTON IN A CYLINDER

[75] Inventors: Dieter Hirt, Augsburg; Leonhard Gerlich, Hirblingen; Eugen Heinle, Neusass, all of Germany

[73] Assignee: Maschinenfabrik Augsburg-Nurnberg Aktiengesellschaft, Augsburg, Germany

[22] Filed: Jan. 16, 1973

[21] Appl. No.: 324,111

[30] Foreign Application Priority Data
Jan. 22, 1972 Germany............... P 22 03 047.3

[52] U.S. Cl.............................. 73/119 R, 73/67.2
[51] Int. Cl. .......................................... G01m 15/00
[58] Field of Search................. 73/116, 118, 119 R, 73/67.2

[56] References Cited
UNITED STATES PATENTS
2,192,863  3/1940  Hetzel et al...................... 73/116 X
2,465,735  3/1949  Lieberherr....................73/116 X Primary Examiner—Jerry W. Myracle
Attorney—Flynn & Frisfauf

[57] ABSTRACT

A transducer is connected to the cylinder sleeve or liner, and deflection, preferably axial vibration or oscillation of the liner is converted into an electrical signal, which is integrated, and detected with respect to a reference level; if a vibration frequency, particularly in the ultrasonic range is detected, or if vibration amplitudes exceed a certain level, an alarm signal is provided. The reference level may be a dynamic level, in which output signals from all cylinders of a multi-cylinder engine are combined, and the combined signal is utilized as a dynamic reference for comparison with any individual cylinder signal. Additional operating parameters can be considered in a logic circuit, for example fuel supply, or extent of loading on the engine, with feedback to reduce fuel supply, or shut off the engine upon detection of excessive vibration in any one or more cylinders.

21 Claims, 3 Drawing Figures

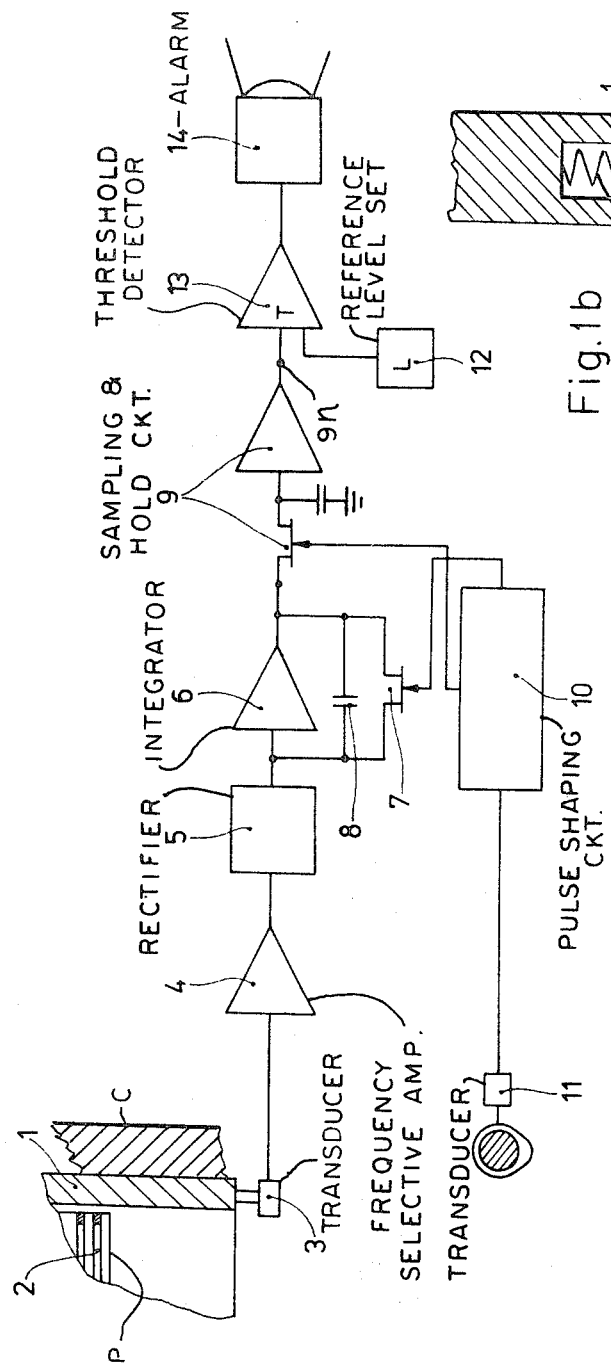
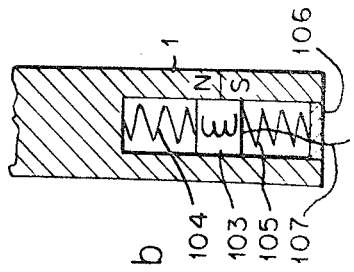
Fig. 1a
Fig. 1b

METHOD AND APPARATUS TO MONITOR QUALITY OF OPERATION OF A PISTON IN A CYLINDER

The present invention relates to an apparatus and to a method to monitor the smoothness of operation of a piston reciprocating within a cylinder, and more particularly the piston of a high speed internal combustion engine. The output derived from a sensing element is an electrical quantity which can be utilized as an alarm signal, a stop signal, or as a control signal to control supply of fuel, or other operation parameters of the engine.

Internal combustion engines, and particularly high power, internal combustion engines are subject to damage, if minor defects at the running surface of the piston (or the piston rings) within the cylinder (or, more particularly the cylinder sleeve) are present. Minor defects can rapidly lead to freezing, or blocking of the piston within the cylinder, or to substantial scoring of the cylinder and the piston liner or piston sleeve, which, in extreme cases, may completely destroy the internal combustion engine or, at least, the respective cylinder thereof.

It has previously been proposed to monitor the operation of internal combustion engines by means of a temperature sensing device (see, for example, German Pat. No. 742,697) which is so located that jamming of a piston in a cylinder is sensed, by excessive temperature rise, in order to prevent locking, or excessive damage. As soon as a piston begins to score the interior of a cylinder, the temperature of the piston (or the cylinder) will rise rapidly due to the substantially increased friction in operation of the piston within the cylinder. A temperature sensing element, located in the piston, is so arranged that at a predetermined temperature it will have a predetermined expansion, or bend, which triggers an alarm signal when a limiting or threshold temperature is exceeded. The alarm signal is then utilized to stop the engine. This arrangement does not operate well since the temperature will rise only at a time when it is too late to prevent substantial damage to the engine by stopping the engine, or disabling a specific cylinder.

It is an object of the present invention to provide a monitoring method and apparatus which indicates quickly that the piston is not operating smoothly, as desired, the indication being obtained in sufficient time to prevent damage to the piston, or cylinder, or both.

SUBJECT MATTER OF THE PRESENT INVENTION

Briefly, it has been found, surprisingly, that the amplitude, or the frequency (or both) of oscillations of the cylinder sleeve or cylinder liner can be utilized to provide a suitable sensing parameter. The cylinder sleeve or cylinder liner is subject to some vibration or oscillation and excessive vibration or oscillation amplitudes, or frequencies (or both) provide an indication that the operation of the piston within the cylinder is not as desired. It is thus possible to indicate faulty operation at its initial phase, so that corrective steps can be taken before substantial damage is done. Usually, if incorrect running is detected quickly, defects can be repaired easily and without substantial effort or time. Sometimes it is merely sufficient to decrease the load on the engine. The pistons may then, at low load, run in properly again, so that the engine can be loaded to its limit thereafter, without outside repair being necessary. Such self correcting behavior of the engine must, however, be undertaken at an early stage of faulty operation.

The longitudinal vibrations or oscillations of the cylinder sleeve or cylinder liner form, in accordance with a preferred feature of the invention, the measuring parameter. The amplitudes or frequency, or both, of these vibrations or oscillations are sensed. The longitudinal vibrations of the cylinder sleeve rapidly increase at an early stage of improper operation, which, if permitted to continue, would lead to scoring or eventual binding of the pistons within the cylinder. Thus, the measuring instruments may be sturdy and need not be of delicate, very high sensitivity type. Such sturdy measuring instruments themselves improve the reliability of the entire system and the danger that the measuring system, itself, is subject to breakdown is thus substantially avoided.

The preferred measuring parameter would be an electric voltage or current. Electronic apparatus, which is readily available and can be constructed as integrated circuits, can then be used to evaluate electrical or voltage pulses, such electronic apparatus being simple and of extremely small size. Measuring and indication can be obtained remotely, after amplification of the electrical parameters utilized as a sensing element, so that indication devices can be located conveniently to operating personnel and remote from interfering equipment or devices.

In accordance with a feature of the invention, the electrical signal is selectively amplified with respect to frequency, since the vibrations arising as the running conditions deteriorate do not cause vibration frequencies throughout a wide frequency band, but rather cause vibration to rise within a quite narrow band. Thus, frequency selective amplification is a good indication of deterioration of operating quality of the engine. Vibrations within the ultrasonic region are particularly prevalent; further, the inherent or critical vibrations of the cylinder sleeve may become pronounced, and of high intensity, as the operating conditions continue to deteriorate. Selecting vibrations therefore both with respect to frequency and with respect to amplitude (or, either one) permits rapid detection of changes in operating quality of the engine.

The invention will be described by way of example with reference to the accompanying drawings wherein:

FIG. 1a is a schematic general circuit diagram of a monitoring system for a single cylinder;

FIG. 1b is a fragmentary detailed view, to a greatly enlarged scale, of a transducer arrangement for a single cylinder.

Figure 2:
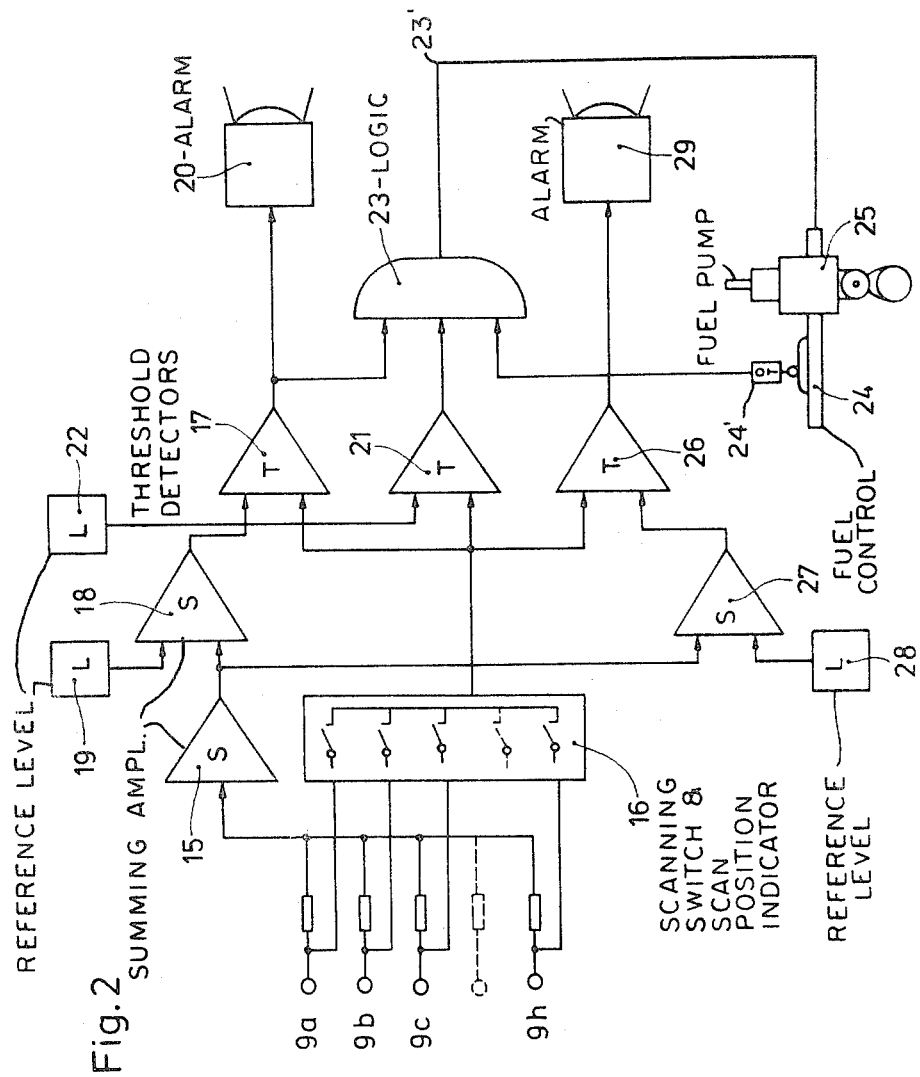
FIG. 2 is a schematic block circuit diagram of a monitoring system for a multicylinder engine.

A piston P is operable longitudinally within the cylinder C, the inside of which is lined with a cylinder sleeve or cylinder liner 1. The piston has piston rings 2. Excessive friction between the piston rings, or the piston and the cylinder sleeve or liner may lead to hot spots or excessive heating at particular regions of the piston, or on the cylinder; the temperature may even reach melting temperature of the materials and in any event leads to substantial increased shear forces acting on the cylinder liner 1. The shear forces, due to friction, which if permitted to persist may cause scoring or binding of the piston will introduce longitudinal vibration and oscillation of the cylinder sleeve 1. The amplitudes and the frequency (or either) of these oscillations are sensed by a transducer 3 which provides electrical output signals in the form of voltage or current pulses. The signals provided by transducers 3 are amplified in the frequency selective amplifier 4 and connected to a rectifier system 5, in which positive and negative pulses are rectified. Transducer 3 and amplifier 4 may be included in a single element located in a bore within the cylinder liner 1 (see FIG. 1b). Usually, one single transducer per cylinder suffices. More than one transducer per cylinder may be used, the various transducers per cylinder being distributed about the circumference of the cylinder liner 1. Noise is essentially prevented from being conducted to the frequency selective amplifier 4 by locating the transducer directly on, or in the cylinder sleeve, so that vibration, or other extraneously arising disturbances can be eliminated, although defective and uneven operation of the piston within the cylinder is directly sensed at the point where the relative movement (piston within the cylinder sleeve) occurs, without introduction of stray signals, or extraneous damping. Thus, the various parts can be easily assembled, and the assembly step of the transducer can be carried out even before the cylinder sleeve is assembled into the cylinder block itself. Extraneous disturbances will not affect the signals derived from the transducer. It is also possible to sense oscillations of the cylinder sleeve, for example over solid state transmitting elements, such as solid state sound transmission devices leading to vibration sensors, or the like, which are located outside of the cylinder, or of the motor itself. External vibration sensing elements, sensing vibrations transmitted thereto by means of sound transmission elements are particularly simple in construction.

Rectifier 5 is connected to an integrator 6 which integrates the various single pulses derived from transducer 3 over amplifier 4 and rectifier 5, for a predetermined time, for example for the duration of one operating cycle of the engine. The integration period or interval is controlled by a control circuit including capacitor 8 and transistor 7, typically a field effect transistor (FET). The voltage on capacitor 8 is extinguished or discharged briefly once for each operating cycle, so that the integration by integrator 6 will always start from the same starting level. The integrator 6, at the end of any one integration period thus will provide a final value which is independent of rotation or speed of the engine. This simple value is transferred to a sampling and holding circuit 9 (hereinafter: SH Ckt), to be stored therein. The storage of the result of the integration provides continuous, uninterrupted supervision of the operation of the engine. The output from the SH Ckt 9 will, continuously, have the final integration value appear thereat. Transistor 7 is controlled with respect to the SH Ckt with a slight delay, so that the output from the integrator is reliably transferred to the circuit 9 from integrator 6. The timing pulses to control integrator 6 and the SH Ckt 9 are derived from a wave shaping or pulse shaping circuit 10 which, in turn, is controlled by a transducer 11 which provides one pulse for each rotation of the engine. The pulses can readily be obtained from the crankshaft or from the camshaft of the engine, by connecting a cam to a cam-operated switch. If the signal obtained from the SH Ckt 9 exceeds a limit or level set by a reference level setting circuit 12, a threshold detector 13 will respond to effect generation of an alarm signal in alarm circuit 14.

The output from the sampling and hold circuit 9 is available at the terminal 9n. Multicylinder engines can be monitored by utilizing signals from a number of cylinders, as will be explained in connection with FIG. 2. In this figure, summing amplifiers are labeled S, reference level generators L, and threshold detectors T. The reference level generators may, for example, be put in the circuit by potentiometers.

The outputs from the various SH-Ckts 9 are applied to terminals 9a, 9b . . . 9h corresponding to terminal 9n of FIG. 1. The signals at terminals 9a . . . 9h are connected to a summing amplifier 15 and, simultaneously, to a scanning switch and scan position indicator 16, which may also be termed a multiplexer. The signals, sequentially derived from scanning switch 16 are applied to three threshold detectors. Threshold detector 16 compares the signal appearing at any one of the terminals 9a–9h with an average value, forming an arithmetic average, of all the output signals of the various respective SH Ckts. The threshold circuit 17 compares the respective signal values from the scanning switch, derived from the respective SH Ckts with the arithmetic average of all the signals, to provide a dynamic reference level. The signals, summed in summing amplifier 15 are increased by an additional level by adding a reference level from generator 19 in summing amplifier 18. If the individual value of any output at terminal 9a, 9b . . . 9h exceeds the arithmetic average and additional reference level from generator 19, then threshold detector 17 will provide an output signal which can be utilized to operate the alarm device 20 to provide a preliminary alarm, or the like. Simultaneously, the specific cylinder from which the signal is derived can be indicated on the position indicator portion of scanning switch and scanning position indicator 16.

Scoring or uneven operation of the pistons arises usually only at heavy loading of the engine. The present system can be readily adapted to consider additional criteria of engine operation in order to monitor the quality of operation of the motor, when the decision is to be made whether the motor is to be stopped, or the loading thereon reduced. The signal of threshold detector 17 is, to this end, additionally applied to a logic circuit 23 which logically determines the decision. A reference level generator 22 is connected to a threshold detector 21 which compares the reference level from generator 22 with the individual signal level at any one of the terminals 9a, 9b . . . 9h. If these signals, applied sequentially, exceed the reference level from generator 22, then a signal is provided from threshold detector 21. A signal representative of an additional engine operating parameter is connected to logic circuit 23, so that the logic circuit 23 will have a plurality of signals applied thereto which are decoded or analyzed so that a decision basis is provided to control the motor to reduce load or stop the motor entirely. Transducer 24' provides a fuel-supply signal. The output from logic circuit 23, available at line 23', is utilized to control the fuel supply controller 24, associated with a fuel pump 25. Upon a decision in logic network 23 that damage to the cylinder sleeve is imminent, as sensed by excessive vibration, the output on line 23' is utilized to control the fuel supply to the engine, over pump 25, to reduce the amount of fuel, or shut it off entirely. Other parameters can additionally be introduced to the logic network, to further affect the decision to be made therein, for example engine temperature or the like. If the internal combustion engine is to be operated with a high degree of smoothness, so that even minor vibrations are analyzed and used to control reduction in loading, then reduction of fuel supply to the engine can of course be controlled by a lesser number of inputs to logic 23.

A summing amplifier 27 is connected to the output of summing amplifier 15, and has additionally a negative reference level applied thereto from generator 28, so that summing amplifier 27 will operate as subtraction, or difference circuit. The average value, that is, the dynamic level of the various inputs from terminals 9a, 9b . . . 9h, derived from summing amplifier 15 is subtracted from a fixed reference level from generator 28; the remainder is compared with the respective individual signals derived from the scanning switch 16 in threshold detector 26. If the output from summing amplifier (or, rather, subtraction circuit) 27 falls by a predetermined value below the dynamic threshold, as determined by threshold detector 26, a separate alarm 29 is operated. This circuit is utilized to monitor proper operation of output from the respective transducer 3 (FIG. 1a) providing the output signals, and the associated circuitry and components which form the various measuring channels having outputs connected to terminals 9a, 9b . . . 9h. The various electronic circuits can be formed as integrating elements, located on small silicon chips, to provide reliable circuit components, with low space requirements, and low power consumption.

The rectifier 5 (FIG. 1a) is not strictly necessary but is a preferred form; integrating both the positive and negative pulses derived from transducer 3 results in rapid evaluation of the outputs from the transducer, and elimination of noise and statistically arising interference, and noise signals, to provide a clearly defined and differentiated and clearly recognizable warning signal.

The frequency of pulses derived from transducer 3 are not uniformly distributed over a wide frequency spectrum, as the quality of operation of the engine deteriorates. Thus, amplifier 4 is a frequency selective amplifier and provides preferred and selective amplification of those frequencies which are expected to occur in particularly defined bands, so that the quality of operation can be closely monitored, and any deterioration in smoothness of operation can be recognized quickly. It has been found by experience that vibrations and oscillations in ultrasonic range become pronounced as soon as the quality of operation begins to deteriorate, and before it has reached dangerous proportions. As the quality of operation continues to deteriorate, and scoring of the cylinder sleeve may become imminent, the inherent or critical frequencies, in longitudinal (axial) direction of the cylinder sleeves become high and will have substantial amplitude. By selecting the frequencies which particularly arise, in any one specific engine, characteristic changes in the output signals derived from transducer 3 can be quickly detected.

Monitoring the various cylinders of multi-cylinder engines has the advantage that deterioration in operating characteristics of any particular cylinder can be easily determined. Masking of vibration due to damping, or complete compensation of the specific signals due to extraneous interference or disturbance can be effectively eliminated, and any one cylinder which might be damaged can be easily indicated. The arithmetic average, or another median, average value derived from the summed output of summing amplifier 15 provides a dynamic, load-dependent reference value, with which the operating quality of the respective cylinders can be compared. The threshold value set by the reference level generator 19 preferably is adjusted to be slightly above the noise level of the various cylinders. This effectively prevents false alarms due to possible noise arising in the transducer 3 or the associated circuits of any particular channel. The average or median value is also utilized for fail-safe monitoring of the operation of the various transducers and their associated channels by threshold detector 26 which compares the output of the various channels with a decreased average value.

Scoring by the pistons, usually, occurs only at a certain operating temperature of the cylinder sleeve, or, independently of temperature, when the motor is quite heavily loaded, for example above 75 percent of rated full load. Since such vibrations frequently only occur at such heavy loading, generation of an alarm signal can be utilized simultaneously to reduce the fuel supplied to the engine, or to stop the engine entirely. The logic circuit 23 (FIG. 2) can also be set in such a manner that only if the engine is subjected to a predetermined minimum load, for example 75 percent of rated full load, will the circuit be energized or enabled to respond. This can readily be instrumented by using AND gates. Preventing operation of the the circuit at low loads, or loads below a certain level, additionally insures against false alarms.

The transducers themselves are preferably located at the end of the cylinder sleeve or cylinder liner which is not secured to the cylinder block. This increases their sensitivity and improves the accuracy of measurement, since the excursion, and the vibration or oscillation, of the end of the cylinder sleeve which is not secured to the cylinder block is quite high and essentially occurs without damping.

FIG. 1b illustrates one way in which a transducer can be located in the cylinder liner. A small hole is bored in one side of the cylinder liner 1, closed off by a plug, for example a screw plug 106. A weight 103 is loacted within the bore, spaced centrally by means of a pair of springs 104, 105. The weight includes a sensing coil, located opposite a face of the cylinder liner which, if made of iron, is magnetized as schematically indicated by N, S; otherwise, a small permanent magnet can be inserted in the cylinder liner. The weight 103 additionally can carry all the circuitry involved, if it is formed as an integrated circuit. Electrical connections are carried out by wires 107, passing through plug 106. The entire assembly can be pre-assembled in the cylinder liner before the cylinder liner itself is secured to the engine, that is within the cylinder block C. Upon vibration of the cylinder liner 1, weight 103 will remain essentially stationary (with respect to the cylinder liner 1) due to its own inertia, and the magnetized portion NS of the cylinder liner will thus induce voltages, depending on the rate of change of magnetic flux through a coil, schematically indicated, and carried on the weight 103. The induced pulses provide the output from the transducer which is applied to the amplifier 4 and rectifier 5, both of which can be included as a chip-integrated circuit on or in the weight 103. The fuel control, and the application of the transducer to the cylinder liner have been described specifically in connection with diesel engines; the invention is applicable, however, to any piston-cylinder engine in which the cylinder has a cylinder sleeve or liner.

Various changes and modifications may be made, and features described in connection with any combination or drawing may be applied to other combinations within the inventive concept.

The type of transducer explained in connection with FIG. 1b need not be used, and other types of transducers are suitable. For example, a piezo-electric element, secured beneath a support mass which applies pressure against the piezo-electric element may be used, the support mass being resiliently retained, for example under spring pressure, in a bore of the cylinder sleeve or liner 1. Of course, an integrated circuit can readily be secured within the same bore, adjacent the piezo-electric element. The transducer system is loaded transversely, and is subjected to single-ended compression. This construction is essentially insensitive to deformations of the housing, temperature changes, and acoustic as well as magnetic interfering influences; it is also essentially immune against transverse oscillations. Such types of transducers are made, for example, by the firm of Brüel & Kjaer, of Denmark. Quartz is a suitable material for the piezo-electric element, and provides rapid response necessary in a transducer used in high-speed internal combustion engines.

We claim:

1. Method of monitoring quality of operation, for example running smoothness, of a piston (P) in a cylinder (C), the cylinder having a cylinder sleeve (1) in which an output signal representative of piston operation is obtained,
   comprising the steps of
   sensing the deflection of the cylinder sleeve (1) with respect to the cylinder (C) as the piston (P) operates within the cylinder sleeve (1);
   and deriving said output signal as a representation of said sensed deflection.

2. Method according to claim 1 including the step of analyzing the output signal for amplitude and generating an indication signal representative of amplitudes exceeding a predetermined level.

3. Method according to claim 1 including the step of analyzing the output signal for a predetermined frequency range, and generating an indication signal representative of frequency within said range.

4. Method according to claim 3 wherein the frequency range is in the ultrasonic range.

5. Method according to claim 1 including the step of analyzing the output signal for amplitude in excess of a certain range, and for frequency within a predetermined band and generating an indication signal representative of either amplitude in excess of a predetermined level or frequency within a predetermined range, or both.

6. Method according to claim 1 wherein the step of sensing deflection of the cylinder sleeve (1) comprises the step of sensing deflection of the cylinder sleeve in axial direction.

7. Method according to claim 1 wherein the output signal is electrical.

8. Method according to claim 1 further comprising the step of analyzing the output signal with respect to predetermined frequencies, and amplifying said predetermined frequencies.

9. Method according to claim 1 in which the output signal has negative and positive components;
   and said method comprises the step of rectifying said components and integrating the rectified components.

10. Method according to claim 9 wherein the integrating time constant is essentially the same as the time of one revolution of the engine piston crankshaft.

11. Method according to claim 10 including the step of
   a. storing the integrated signal during one integration cycle until the end of a subsequent operation cycle of the piston, and storing the representation of the integrated signal;
   b. erasing the integrated result;
   c. and repeating steps (a) and (b).

12. Method to monitor a multi-cylinder engine comprising the steps of
   individually monitoring the respective cylinders of the engine
   in accordance with the method of claim 1;
   and analyzing the output signals derived from the individual cylinders.

13. Method according to claim 12 including the steps of
   forming an average value of derived output signals from all the cylinders to provide a dynamic reference value signal;
   and determining deviation of any individual output signal from said dynamic reference with respect to a predetermined level.

14. Method according to claim 13 further comprising the step of
   adding a signal representative approximately of signal noise level arising during the sensing and deriving steps, in any one cylinder, to said dynamic reference level to form said predetermined level.

15. Method according to claim 13 further comprising the step of indicating decrease of the dynamic reference level below a predetermined level.

16. Method according to claim 15 wherein the step of indicating drop of the dynamic reference level comprises the step of forming the difference between a signal representative of a predetermined level from the dynamic reference level signal;
   and providing an indication if the remaining difference signal drops below a further predetermined level.

17. Method according to claim 12 further comprising the step of generating a signal representative of loading on the engine;
   logically combining said loading signal with the individual derived output signals from the cylinder;
   and controlling fuel supply to the engine in accordance with a characteristic of the logically combined loading signal and cylinder output signals.

18. Apparatus to monitor the quality of operation of a piston (P) in a cylinder (C), having a cylinder sleeve (1) to obtain an output signal representative of quality of piston operation, comprising
   a transducer element (3) located in vibration transfer relation to the cylinder sleeve (1) or liner;
   means deriving from said transducer an electrical output signal having a characteristic representative of vibration of the cylinder sleeve, or liner;

and means (4, 5, 6, 9, 12, 13) analyzing said signal with reference to a predetermined level (12) and deriving an alarm output (14) if the signal exceeds said predetermined level.

19. Apparatus according to claim 18 wherein the transducer element (3; 103) is hermetically sealed in the cylinder sleeve (1).

20. Apparatus to monitor the operation of a multi-cylinder engine comprising
a plurality of apparatus according to claim 18, one for each cylinder;
means (15) combining the output signals from the transducers to provide a combined output signal forming a dynamic reference signal;
and means (17) comparing the combined dynamic reference signal with the signals derived from the indidual transducers of the individual cylinders to provide an alarm output if the signal from any one individual cylinder deviates from the dynamic reference signal by a predetermined amount.

21. Apparatus according to claim 20 comprising means (24') generating an engine operation signal representative of an engine operating parameter;
logic means (23) logically combining said dynamic reference signal, said individual output signals from the individual cylinders, and said operation signal, and deriving a control output signal;
and feedback circuit means (23', 25) controlling engine operation under command of said control output signal.

* * * * *